United States Patent
Choi et al.

(10) Patent No.: US 9,530,999 B2
(45) Date of Patent: Dec. 27, 2016

(54) SECONDARY BATTERY MODULE

(71) Applicant: SAMSUNG SDI CO., LTD., Yongin-si, Gyeonggi-do (KR)

(72) Inventors: Hong-Keun Choi, Yongin-si (KR); Min-Cheol Bae, Yongin-si (KR); Ik-Jae Jeong, Yongin-si (KR); Kyoung-Hwan Noh, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 78 days.

(21) Appl. No.: 14/340,115

(22) Filed: Jul. 24, 2014

(65) Prior Publication Data

US 2015/0079453 A1    Mar. 19, 2015

(30) Foreign Application Priority Data

Sep. 13, 2013  (KR) .................. 10-2013-0110615

(51) Int. Cl.
*H01M 2/20* (2006.01)

(52) U.S. Cl.
CPC ............. *H01M 2/204* (2013.01); *H01M 2/206* (2013.01)

(58) Field of Classification Search
CPC ........ H01M 2/20; H01M 2/202; H01M 2/204; H01M 2/206
See application file for complete search history.

(56) References Cited

U.S. PATENT DOCUMENTS

| 9,136,039 | B2* | 9/2015 | Diez | H01M 2/202 |
| 9,263,722 | B2* | 2/2016 | Ikeda | H01M 2/204 |
| | | | | 174/254 |
| 2006/0027390 | A1 | 2/2006 | Suzuki et al. | |
| 2006/0032667 | A1 | 2/2006 | Sato | |
| 2008/0063929 | A1* | 3/2008 | Byun | H01M 2/202 |
| | | | | 429/121 |
| 2009/0123830 | A1 | 5/2009 | Kato et al. | |
| 2010/0053927 | A1 | 3/2010 | Inoue et al. | |
| 2011/0159353 | A1 | 6/2011 | Byun et al. | |

(Continued)

FOREIGN PATENT DOCUMENTS

| JP | 2007323951 A | * 12/2007 |
| JP | 2008-071733 A | 3/2008 |

(Continued)

OTHER PUBLICATIONS

Tanabe. Machine Translation JP 2010-267444.*
Korean Office Action dated Jul. 20, 2016 in Corresponding Korean Patent Application No. 10-2013-0110615.

*Primary Examiner* — Carlos Barcena
(74) *Attorney, Agent, or Firm* — Lee & Morse, P.C.

(57) ABSTRACT

A secondary battery module includes a plurality of secondary batteries each including an electrode assembly, a case accommodating the electrode assembly, and electrode terminals electrically connected to the electrode assembly and extending outward from the case, and a bus bar that electrically connects neighboring electrode terminals of the plurality of secondary batteries. The bus bar includes a first part including penetration holes through which the electrode terminals penetrate such that the bus bar is fastenable to the electrode terminals and a second part extending from the first part, the second part being bent to face the first part.

7 Claims, 13 Drawing Sheets

(56) References Cited

U.S. PATENT DOCUMENTS

2012/0015550 A1* 1/2012 Ikeda .................. H01M 2/1077
439/391

FOREIGN PATENT DOCUMENTS

| | | | |
|---|---|---|---|
| JP | 2008-204985 | A | 9/2008 |
| JP | 2010267444 | A * | 11/2010 |
| JP | 2011-228217 | A | 11/2011 |
| KR | 1998-063770 | U | 11/1998 |
| KR | 10-2005-0099505 | A | 10/2005 |
| KR | 10-2006-0049056 | A | 5/2006 |
| KR | 10-2008-0022129 | A | 3/2008 |
| KR | 10-2011-0076738 | A | 7/2011 |

* cited by examiner

SECONDARY BATTERY MODULE

CROSS-REFERENCE TO RELATED APPLICATION

Korean Patent Application No. 10-2013-0110615, filed on Sep. 13, 2013, in the Korean Intellectual Property Office, and entitled: "Secondary Battery Module," is incorporated by reference herein in its entirety.

BACKGROUND

1. Field

Embodiments relate to a secondary battery module including a plurality of secondary batteries.

2. Description of the Related Art

Unlike primary batteries, secondary batteries are rechargeable. Low-capacity secondary batteries are widely used in small portable electronic devices such as cellular phones, laptop computers, and camcorders, and high-capacity secondary batteries are widely used as power sources for driving motors of hybrid vehicles, etc.

Recently, high-power secondary batteries using high-energy-density non-aqueous electrolyte have been developed, and such high-power secondary batteries may be connected in series for increasing capacity and driving a motor of an electric vehicle, etc.

In general, a high-capacity secondary battery module may include a plurality of secondary batteries connected in series, and the secondary batteries may be cylinder type secondary batteries or prismatic secondary batteries.

SUMMARY

Embodiments are directed to a secondary battery module including a plurality of secondary batteries each including an electrode assembly, a case accommodating the electrode assembly, and electrode terminals electrically connected to the electrode assembly and extending outward from the case, and a bus bar that electrically connects neighboring electrode terminals of the plurality of secondary batteries. The bus bar includes a first part including penetration holes through which the electrode terminals penetrate such that the bus bar is fastenable to the electrode terminals, and a second part extending from the first part, the second part being bent to face the first part.

The second part may not overlap the penetration holes.

The second part may have a T-shape or H-shape.

The first part and the second part may have a same thickness.

The bus bar may be fastenable to the electrode terminals using nuts.

The secondary batteries may be connected in series or parallel with each other through the bus bar.

Embodiments are also directed to a secondary battery module including a plurality of secondary batteries, each including an electrode assembly, a case accommodating the electrode assembly, and electrode terminals electrically connected to the electrode assembly and extending outward from the case, and a bus bar electrically connecting neighboring electrode terminals of the plurality of secondary batteries. The bus bar includes a first part including a plurality of grooves spaced apart from each other, the grooves being located at sides of the first part corresponding to fastening sites of the bus bar with the electrode terminals.

The first part may be welded to the electrode terminals through the grooves.

The secondary battery module may further include a second part extending from the first part, the second part being bent to face the first part.

The second part may have a same area as the first part.

Embodiments are also directed to a secondary battery module including a plurality of secondary batteries, each including an electrode assembly, a case accommodating the electrode assembly, and electrode terminals electrically connected to the electrode assembly and extending outward from the case, and a bus bar electrically connecting neighboring electrode terminals of the plurality of secondary batteries. The bus bar includes a first part including a plurality of first recesses that enclose the electrode terminals such that the first recesses are fastenable to the electrode terminals, the first recesses being formed at bottom sides of the first part and spaced apart from each other.

The bus bar may be welded to the electrode terminals through the first part.

The first part may further include a plurality of second recesses corresponding to the first recesses, the second recesses being formed in top sides of the first part and spaced apart from each other.

The first part may be welded to the electrode terminals through the second recesses.

The secondary battery module may further include a second part extending from the first part, the second part being bent to face the first part.

The second part may have a same area as the first part.

The electrode assembly may include a first electrode plate, a second electrode plate, and a separator disposed between the first and second electrode plates.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations will be ruled out in order not to unnecessarily obscure subject matters. It will be understood that although the terms first" and "second" are used herein to describe various elements, these elements should not be limited by these terms. Terms are only used to distinguish one element from other elements. In the following description, the technical terms are used only for explaining a specific exemplary embodiment while not limiting the present invention. The terms of a singular form may include plural forms unless referred to the contrary. The meaning of 'include' specifies a property, a fixed number, a step, a process, an element, a component, and a combination thereof but does not exclude other properties, fixed numbers, steps, processes, elements, components, and combinations thereof.

Figure 1:
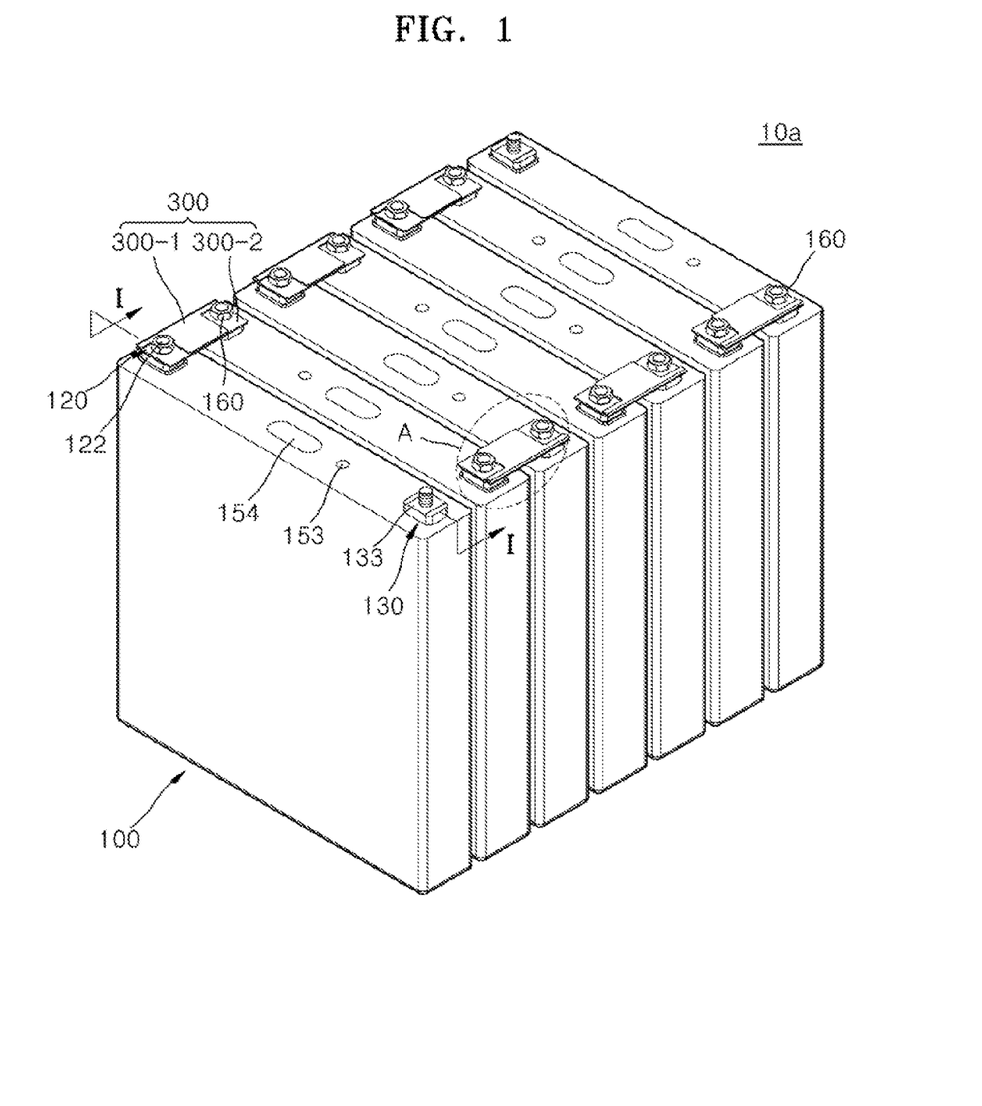
FIG. 1 illustrates a perspective view schematically depicting a secondary battery module according to an embodiment.
Figure 2:
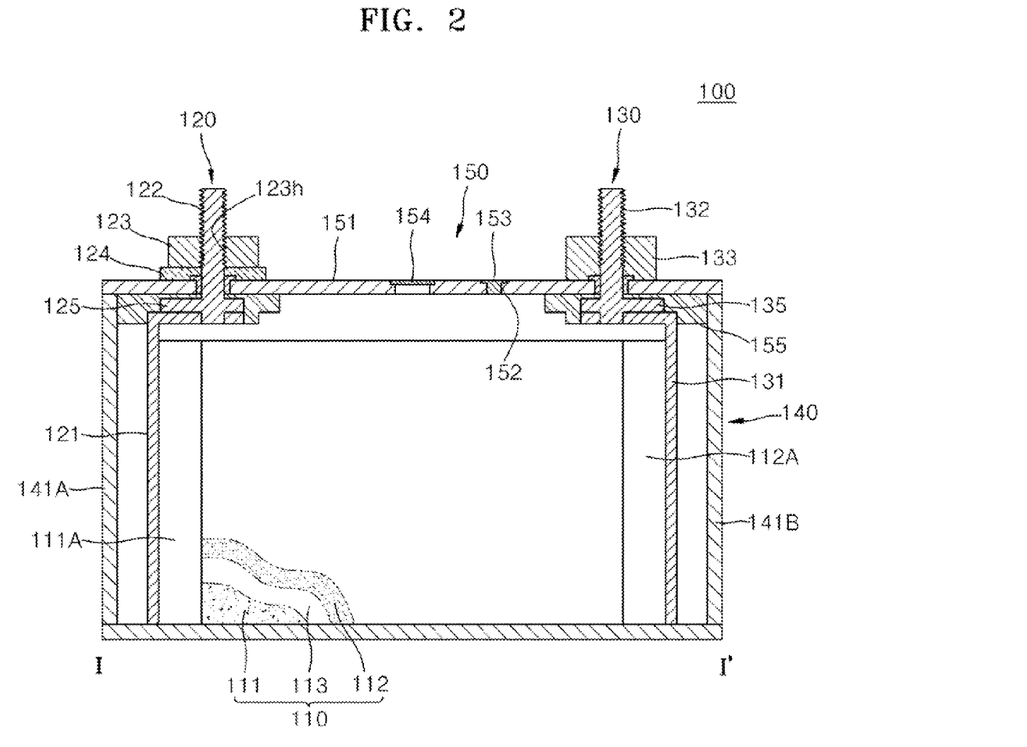
FIG. 2 illustrates a cross-sectional view taken along line I-I of FIG. 1, depicting a secondary battery.

FIG. 1 illustrates a perspective view schematically depicting a secondary battery module 10a according to an embodiment, and FIG. 2 illustrates a cross-sectional view taken along line I-I of FIG. 1, depicting a secondary battery 100.

Referring to FIG. 1, the secondary battery module 10a includes a plurality of secondary batteries 100 and bus bars 300 configured to connect the secondary batteries 100.

Referring to FIG. 2, each of the secondary batteries 100 may include an electrode assembly 110, first and second electrode terminals 120 and 130, a case 140, and a cap assembly 150.

The electrode assembly 110 may be formed by winding or stacking a first electrode plate 111, a separator 113, and a second electrode plate 112 that have a thin plate or film shape. The first electrode plate 111 may function as a negative electrode, and the second electrode plate 112 may function as a positive electrode. In other implementations, the first electrode plate 111 and the second electrode plate 112 may function oppositely. In addition, the first and second electrode plates 111 and 112 may be disposed to have different polarities.

The first electrode plate 111 may be formed by applying a first electrode active material such as graphite or carbon to a first electrode collector formed of metal foil such as copper or nickel foil. The first electrode plate 111 may include a first electrode non-coating portion 111A to which the first electrode active metal is not applied. The first electrode non-coating portion 111A may be fixed to a first collecting plate 121 by ultrasonic welding. The first electrode non-coating portion 111A may function as a current passage between the first electrode plate 111 and the outside of the first electrode plate 111.

The second electrode plate 112 may be formed by applying a second electrode active material such as a transition metal oxide to a second electrode collector formed of metal foil such as aluminum foil. The second electrode plate 112 may include a second electrode non-coating portion 112A to which the second electrode active metal is not applied. The second electrode non-coating portion 112A may be fixed to a second collecting plate 131 by ultrasonic welding. The second electrode non-coating portion 112A may function as a current passage between the second electrode plate 112 and the outside of the second electrode plate 112.

The separator 113 may be disposed between the first electrode plate 111 and the second electrode plate 112. The separator 113 prevents a short circuit and allows movement of lithium ions. The separator 113 may be formed of a polyethylene film or a film including polyethylene and polypropylene.

The electrode assembly 110 may be accommodated in the case 140 substantially together with electrolyte. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$. The electrolyte may be liquid, solid, or gel.

The first and second electrode terminals 120 and 130 may be coupled to both end parts of the electrode assembly 110 in a manner such that the first and second electrode terminals 120 and 130 are electrically connected to the first and second electrode non-coating portions 111A and 112B, respectively.

The first electrode terminal 120 may be formed of a metal or an equivalent thereof and may be electrically connected to the first electrode non-coating portion 111A. The first electrode terminal 120 may include the first collecting plate 121, a first collecting terminal 122, and a first terminal plate 123.

The first collecting plate 121 may be in contact with the first electrode non-coating portion 111A of the electrode assembly 110. The first collecting plate 121 may be welded to the first electrode non-coating portion 111A. The first collecting plate 121 may be approximately shaped like "⌐" (for example, an inverted L shape). A terminal hole may be formed in an upper side of the first collecting plate 121. The first collecting terminal 122 may be inserted in the terminal hole. For example, the first collecting plate 121 may be formed of copper or a copper alloy.

In addition, the first collecting plate 121 may have a length corresponding to the length of the first electrode non-coating portion 111A.

The first collecting terminal 122 penetrates a cap plate 151 and protrudes upwardly by a predetermined length. The first collecting terminal 122 may be electrically connected to the first collecting plate 121 at a lower side of the cap plate 151. The first collecting terminal 122 may protrude upward from the cap plate 151 by a predetermined length. A flange 125 may extend laterally from a lower position of the first collecting terminal 122 under the cap plate 151 so as to prevent separation of the first collecting terminal 122 from the cap plate 151.

A portion of the first collecting terminal 122 lower than the flange 125 may be inserted in the terminal hole of the first collecting plate 121 and may be welded to the first collecting plate 121. In addition, a part of the first collecting terminal 122 higher than the flange 125 may be fixed to the first terminal plate 123. The first collecting terminal 122 may be electrically insulated from the cap plate 151. For example, the first collecting terminal 122 may be formed of one of copper, copper alloys, and equivalents thereof.

The first terminal plate 123 may have a penetration hole 123h formed approximately vertically in a center region thereof. The first collecting terminal 122 may be inserted in the penetration hole 123h for coupling with the first terminal plate 123. The first terminal plate 123 may be formed of one of stainless steel, copper, copper alloys, aluminum, aluminum alloys, and equivalents thereof, as examples. The first terminal plate 123 and the cap plate 151 may be insulated from each other by an upper insulator 124.

The second electrode terminal 130 may be formed of a metal or an equivalent thereof and may be electrically connected to the second electrode non-coating portion 112A. The second electrode terminal 130 may include the second collecting plate 131, a second collecting terminal 132, and a second terminal plate 133. The second electrode terminal 130 may have substantially the same structure as that of the first electrode terminal 120. Thus, a detailed description thereof will not be repeated. The second collecting plate 131 and the second collecting terminal 132 may be formed of one of aluminum, aluminum alloys, and equivalents thereof. The second terminal plate 133 may be formed of one of stainless steel, aluminum, aluminum alloys, copper, copper alloys, and equivalents thereof.

The second collecting plate 131 may have a length corresponding to the length of the second electrode non-coating portion 112A.

The second terminal plate 133 may be electrically connected to the cap plate 151. In this case, the case 140 and the cap plate 151 may have the same polarity (for example, a positive polarity) as that of the second electrode terminal 130.

The case 140 may be formed of a conductive metal such as aluminum, an aluminum alloy, or steel plated with nickel. The case 140 may have an approximately hexahedron shape including an opening to receive the electrode assembly 110, the first electrode terminal 120, and the second electrode terminal 130. The secondary battery 100 may be sealed by coupling the cap assembly 150 to the opening of the case 140. The inner surface of the case 140 may be treated to be insulated from the electrode assembly 110, the first electrode terminal 120, the second electrode terminal 130, and the cap assembly 150.

The case 140 may have a shape corresponding to the shape of the electrode assembly 110. Both sides of the case 140 may have shapes corresponding to the shapes of the first and second electrode non-coating portions 111A and 112B of the electrode assembly 110. The case 140 may include a first side 141A corresponding to the first electrode non-coating portion 111A. The case 140 may include a second side 141B corresponding to the second electrode non-coating portion 112A.

The cap assembly 150 may include the cap plate 151, an electrolyte injection hole 152, a sealing plug 153, and a safety vent 154.

The cap plate 151 may seal the case 140. The cap plate 151 may include a hole to receive the first collecting terminal 122 connected to the first collecting plate 121. The cap plate 151 may include another hole to receive the second collecting terminal 132 connected to the second collecting plate 131. The first and second electrode terminals 120 and 130 may include gaskets to insulate the cap plate 151. In addition, the first and second electrode terminals 120 and 130 may include nuts 160 (refer to FIG. 1) that are screwed on threads of the first and second electrode terminals 120 and 130 to fix the first and second electrode terminals 120 and 130 to the cap plate 151. After electrolyte is injected through the electrolyte injection hole 152 of the cap plate 151, the electrolyte injection hole 152 may be closed with the plug 153 of the cap assembly 150. The safety vent 154 of the cap plate 151 may have a thin thickness so as to be fractured by a preset pressure and release gas.

An insulation member 155 may be disposed on a lower side of the cap plate 151. The insulation member 155 prevents a short circuit between the cap plate 151 and the first and second electrode terminals 120 and 130. That is, the insulation member 155 prevents a short circuit among the first collecting plate 121, the first collecting terminal 122, and the cap plate 151. In addition, the insulation member 155 prevents a short circuit among the second collecting plate 131, the second collecting terminal 132, and the cap plate 151. The insulation member 155 may be formed of, for example, polyphenylene sulfide (PPS).

Referring to FIG. 1, the plurality of secondary batteries 100 may be electrically connected to each other through the plurality of bus bars 300.

The bus bars 300 may be coupled to the first and second electrode terminals 120 and 130 of neighboring secondary batteries 100 to connect the neighboring secondary batteries 100 in series or parallel.

Increasing the thickness of the bus bars 300 of the secondary battery module may increase the current capacity of the bus bars 300. However, if the thickness of the bus bars 300 fastened to the first and second collecting terminals 122 and 132 were to be increased, the heights of the first and second collecting terminals 122 and 132 would also have to be increased, which could limit the design of the secondary battery module 10a.

Figure 3:
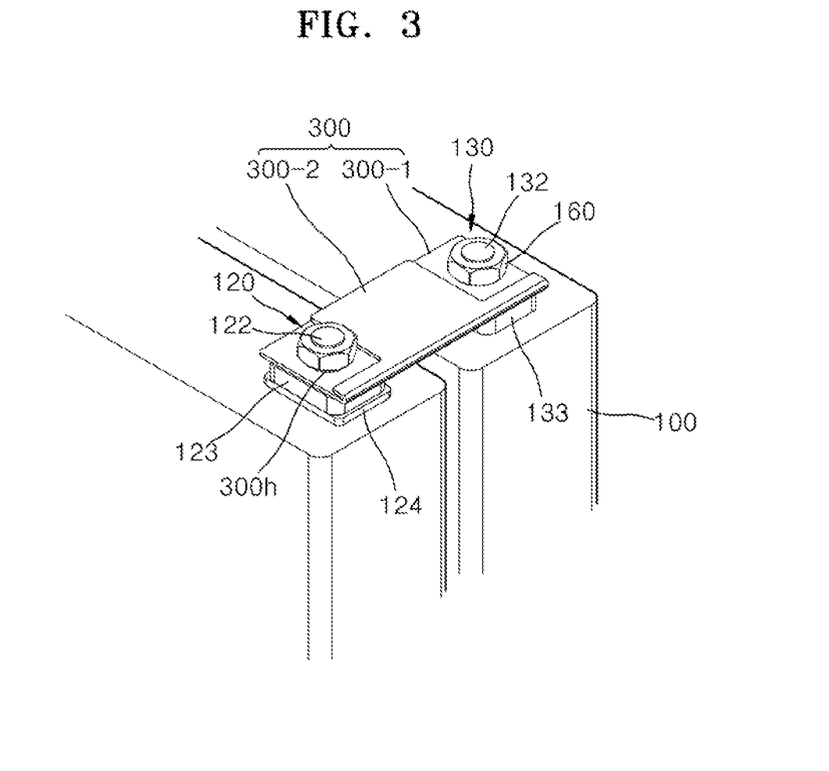
FIG. 3 illustrates an enlarged perspective view depicting Portion A of FIG. 1.

However, according to the embodiment shown in FIG. 3, each of the bus bars 300 may include a first part 300-1 configured to be fastened to the first and second electrode terminals 120 and 130, and a second part 300-2 extending from the first part 300-1 and facing the first part 300-1. Therefore, the current capacity of the bus bars 300 may be increased without increasing the thickness of portion of the bus bars 300 fastened to the first and second collecting terminals 122 and 132.

Figure 4:
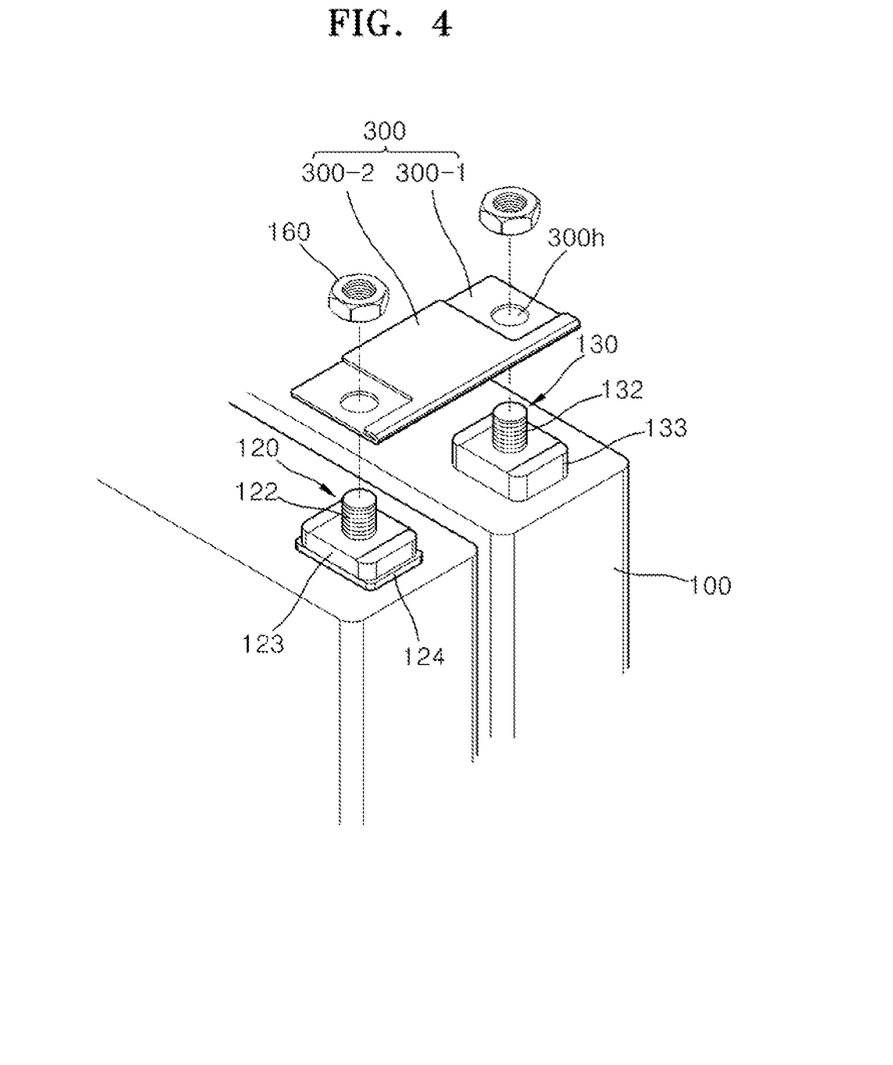
FIG. 4 illustrates an exploded perspective view of FIG. 3.

FIG. 3 illustrates an enlarged perspective view illustrating Portion A of FIG. 1, and FIG. 4 illustrates an exploded perspective view of FIG. 3.

Referring to FIGS. 3 and 4, the bus bar 300 may include the first part 300-1 having penetration holes 300h formed in both sides thereof, and the second part 300-2 extending from the first part 300-1 and bent to face the first part 300-1. The first part 300-1 and the second part 300-2 may have the same thickness. Herein, the term "both sides" of the bus bar 300 is used with reference to the bus bar 300 extending between and connecting first and second electrode terminals 120 and 130 of adjacent batteries 100, one side of the bus bar 300 connecting to one of the secondary batteries and another side of the bus bar 300 connecting to another of the secondary batteries.

The first and second electrode terminals 120 and 130 of the secondary batteries 100 may extend through the penetration holes 300h of the first part 300-1. The second part 300-2 may be bent toward the first part 300-1 by 180 degrees. A bent portion therebetween may have a round shape.

The second part 300-2 may have a suitable shape that does not overlap the penetration holes 300h of the first part 300-1. For example, in FIGS. 3 and 4, the second part 300-2 is shown as having a T-shape that provides open spaces corresponding to the penetration holes 300h of the first part 300-1.

The bus bar 300 may be fastened to the first and second electrode terminals 120 and 130 by inserting the first and second collecting terminals 122 and 132 through the first part 300-1 and screwing the nuts 160 onto the first and second collecting terminals 122 and 132.

According to the current embodiment, the bus bar 300 includes the second part 300-2 extending from the first part 300-1. Accordingly, the area of the bus bar 300 may be increased without increasing the thickness of the bus bar 300. The bus bar 300 may be easily coupled to the first and second electrode terminals 120 and 130 and may have a desired maximum current capacity.

Figure 5:
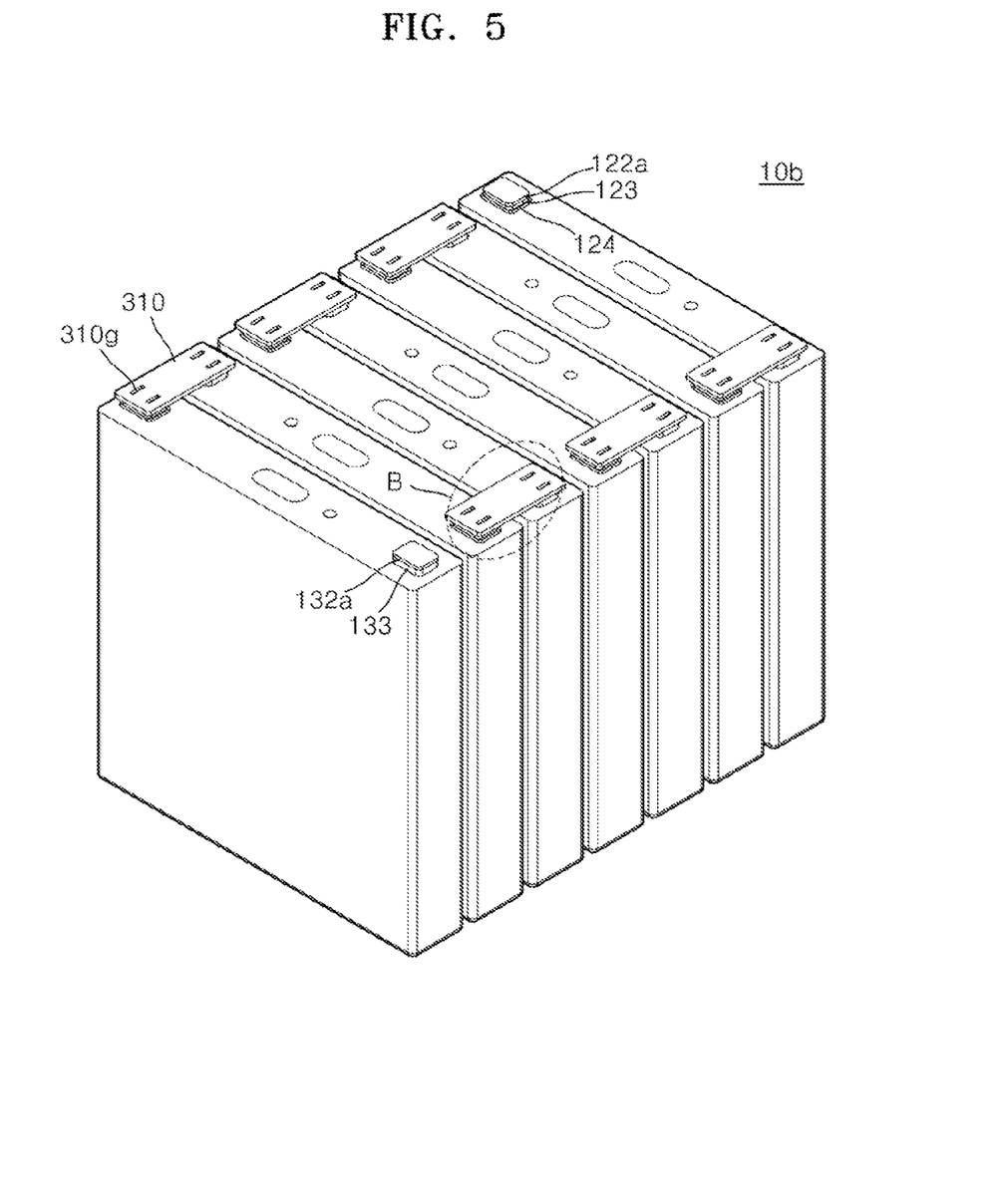
FIG. 5 illustrates a perspective view schematically depicting a secondary battery module according to another embodiment.
Figure 6:
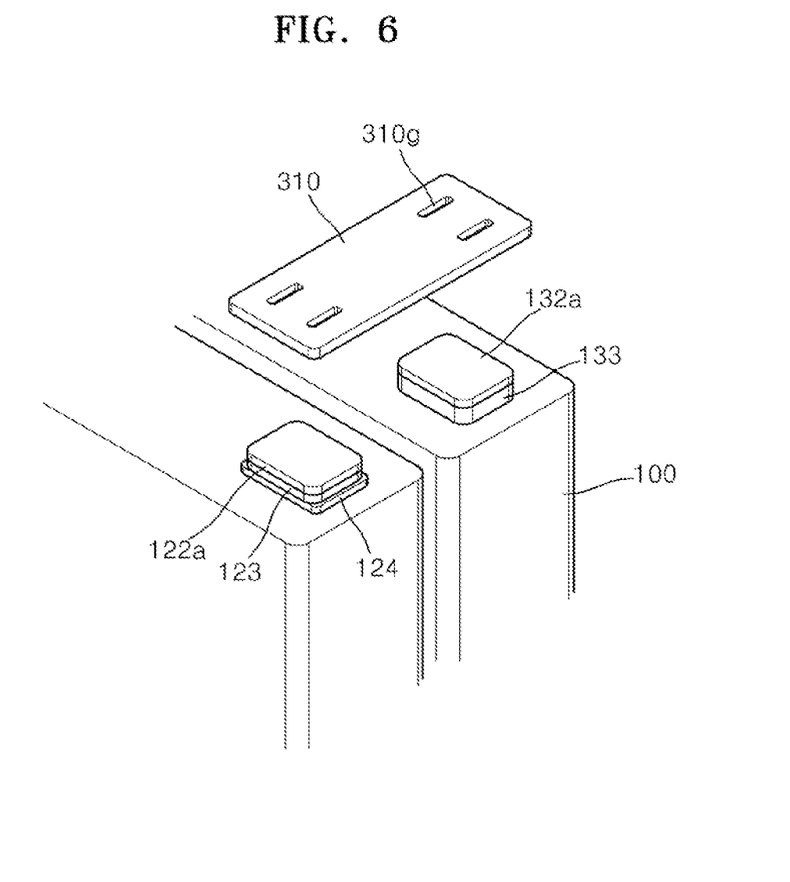
FIG. 6 illustrates an enlarged exploded perspective view depicting Portion B of FIG. 5.

FIG. 5 illustrates a perspective view schematically depicting a secondary battery module 10b according to another embodiment, and FIG. 6 illustrates an enlarged exploded perspective view depicting Portion B of FIG. 5. In FIGS. 5 and 6, the same elements as those of the secondary battery module 10a illustrated in FIG. 1 are denoted by the same reference numerals, and descriptions thereof are not repeated.

Referring to FIGS. 5 and 6, unlike the first and second collecting terminals 122 and 132 illustrated in FIG. 1, first and second collecting terminals 122a and 132a are configured to cover the topsides of first and second terminal plates 123 and 133.

Bus bars 310 electrically connecting a plurality of secondary batteries 100 include a plurality of grooves 310g formed in both sides thereof and spaced apart from each other. The bus bars 310 may be coupled to the first and second collecting terminals 122a and 132a by laser welding.

A bus bar having a high current capacity may have a relatively large thickness, and a high-power laser may be used to connect the bus bar to the first and second collecting terminals 122a and 132a.

However, although the bus bars 310 of the current embodiment have a high current capacity, owing to the grooves 310g formed in welding zones, the bus bars 310 may be coupled to the first and second collecting terminals 122a and 132a using a low-power laser. That is, owing to the grooves 310g formed in welding zones, the thickness of portions of the bus bars 310 making contact with the first and second collecting terminals 122a and 132a may be reduced, and thus the bonding strength between the bus bars 310 and the first and second collecting terminals 122a and 132a may be sufficiently high although a low-power laser is used.

In FIGS. 5 and 6, two grooves 310g are shown as being formed in each side of the bus bars 310, as an example.

Figure 7:
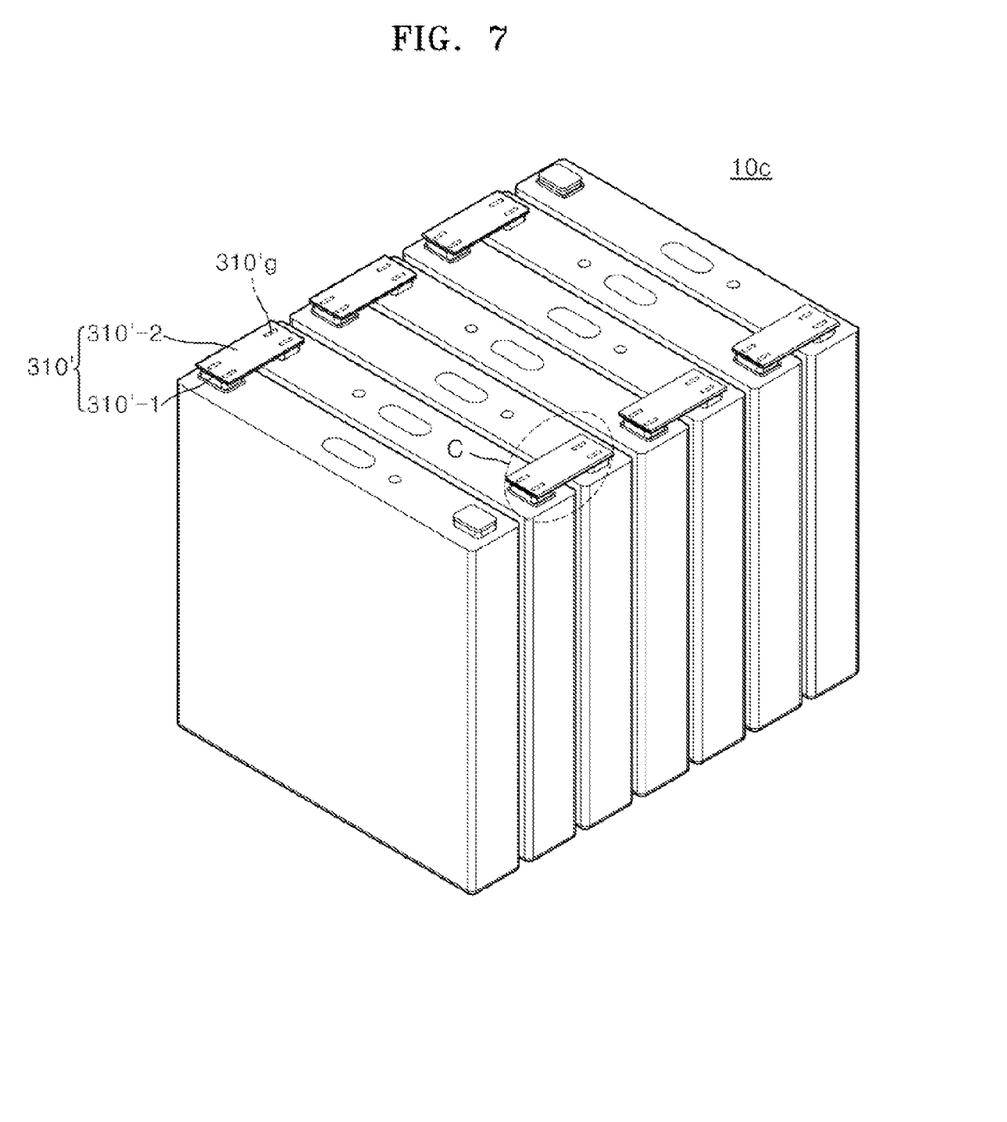
FIG. 7 illustrates a perspective view schematically depicting a secondary battery module according to another embodiment.
Figure 8:
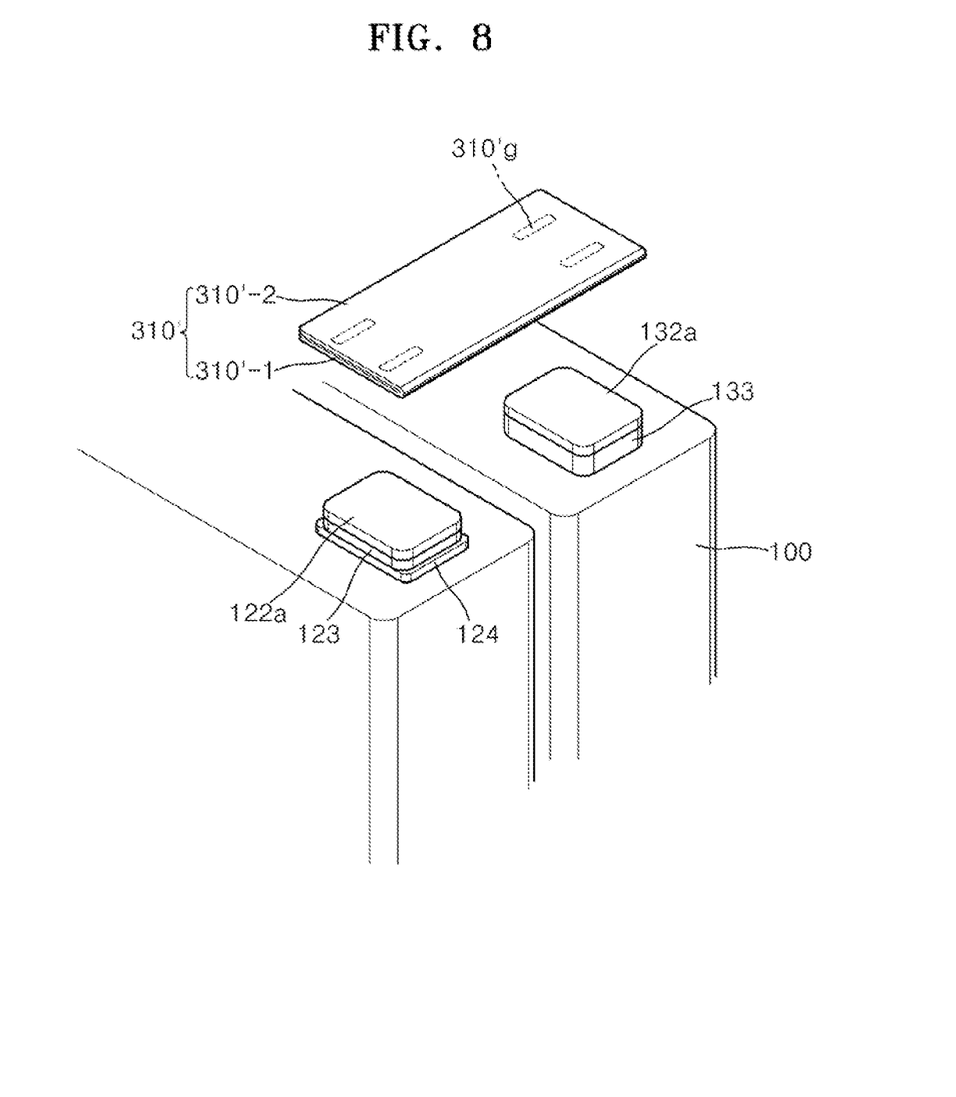
FIG. 8 illustrates an enlarged exploded perspective view depicting Portion C of FIG. 7.

FIG. 7 illustrates a perspective view schematic illustrating a secondary battery module 10c according to another embodiment, and FIG. 8 illustrates an enlarged exploded perspective view illustrating Portion C of FIG. 7. In FIGS. 7 and 8, the same elements as those of the secondary battery module 10b illustrated in FIG. 5 are denoted by the same reference numerals, and descriptions thereof are not repeated.

Referring to FIGS. 7 and 8, unlike in the embodiment shown in FIG. 5, bus bars 310' may include first parts 300'-1 having a plurality of grooves 310'g and second parts 300'-2 bent to face the first parts 300'-1.

After attaching the bus bars 310' to first and second collecting terminals 122a and 132a, the second parts 300'-2 may be bent to face the first parts 300'-1. The first and second parts 310'-1 and 310'-2 may have the same area.

According to the secondary battery module 10c of the current embodiment, owing to the second parts 300'-2 extending from the first parts 300'-1, the bus bars 310' may have a required current capacity although the thickness of the bus bars 310' is not increased.

Figure 9:
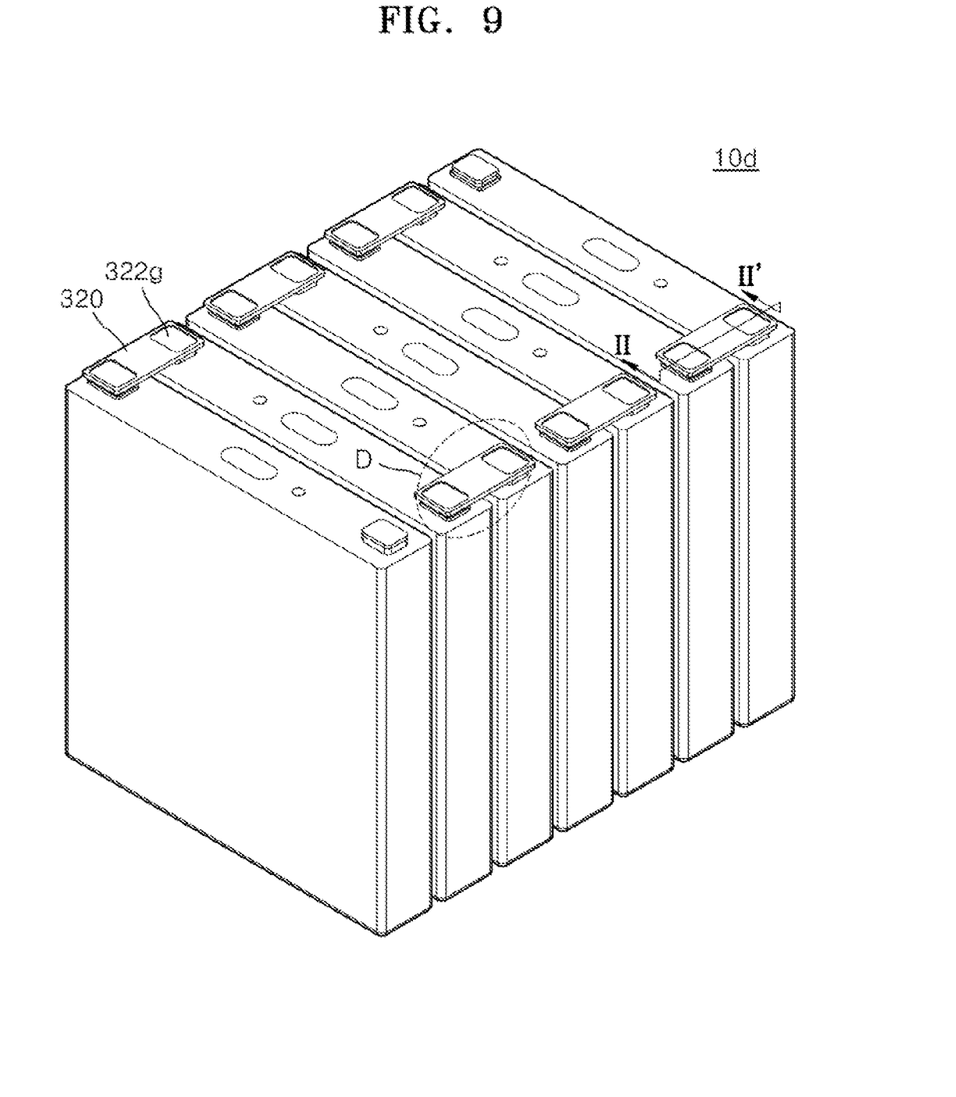
FIG. 9 illustrates a perspective view schematically depicting a secondary battery module according to another embodiment.
Figure 10:
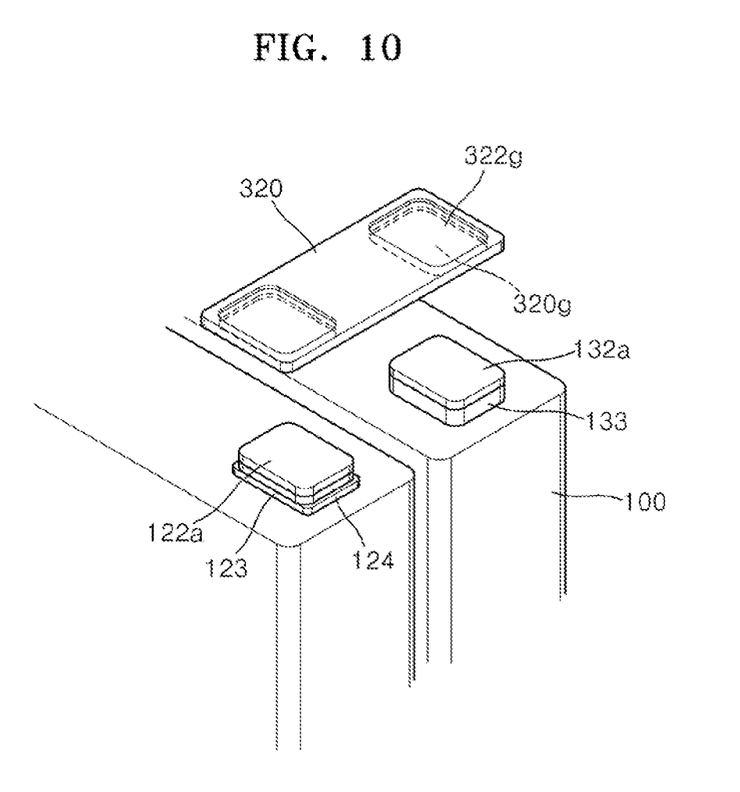
FIG. 10 illustrates an enlarged exploded perspective view depicting Portion D of FIG. 9.
Figure 11:
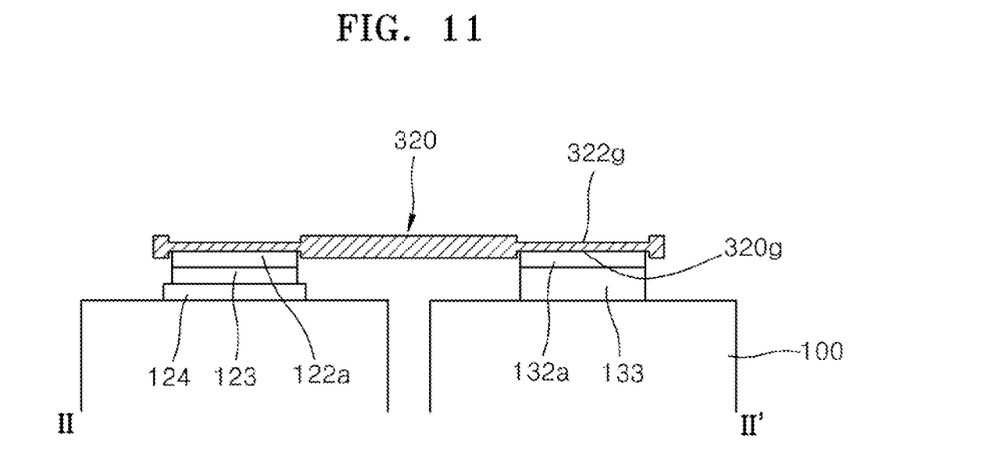
FIG. 11 illustrates a cross-sectional view taken along line II-II' of FIG. 9.

FIG. 9 illustrates a perspective view schematically depicting a secondary battery module 10d according to another embodiment, FIG. 10 illustrates an enlarged exploded perspective view depicting Portion D of FIG. 9, and FIG. 11 illustrates a cross-sectional view taken along line II-II' of FIG. 9. In FIGS. 9 and 10, the same elements as those of the secondary battery module 10b illustrated in FIG. 5 are denoted by the same reference numerals, and descriptions thereof are not repeated.

Referring to FIGS. 9 to 11, bus bars 320 may include first recesses 320g formed in bottom lateral sides thereof to enclose first and second collecting terminals 122a and 132a.

The bus bars 320 may include the recesses 320g to cover top and lateral sides of the first and second collecting terminals 122a and 132a. Accordingly, the thickness of the bus bars 320 may be selectively varied according to zones thereof. The first recesses 320g may be formed in welding zones of the bus bars 320 to be welded to the first and second collecting terminals 122a and 132a. Accordingly, the bus bars 320 may be welded to the first and second collecting terminals 122a and 132a using a low-power laser.

In addition, the bus bars 320 may further include second recesses 322g formed in both top lateral sides thereof and corresponding to the first recesses 320g. The thickness of the bus bars 320 may be selectively minimized at welding zones to be welded to the first and second collecting terminals 122a and 132a. Accordingly, the bus bars 320 may be securely welded to the first and second collecting terminals 122a and 132a although a low-power laser is used.

Figure 12:
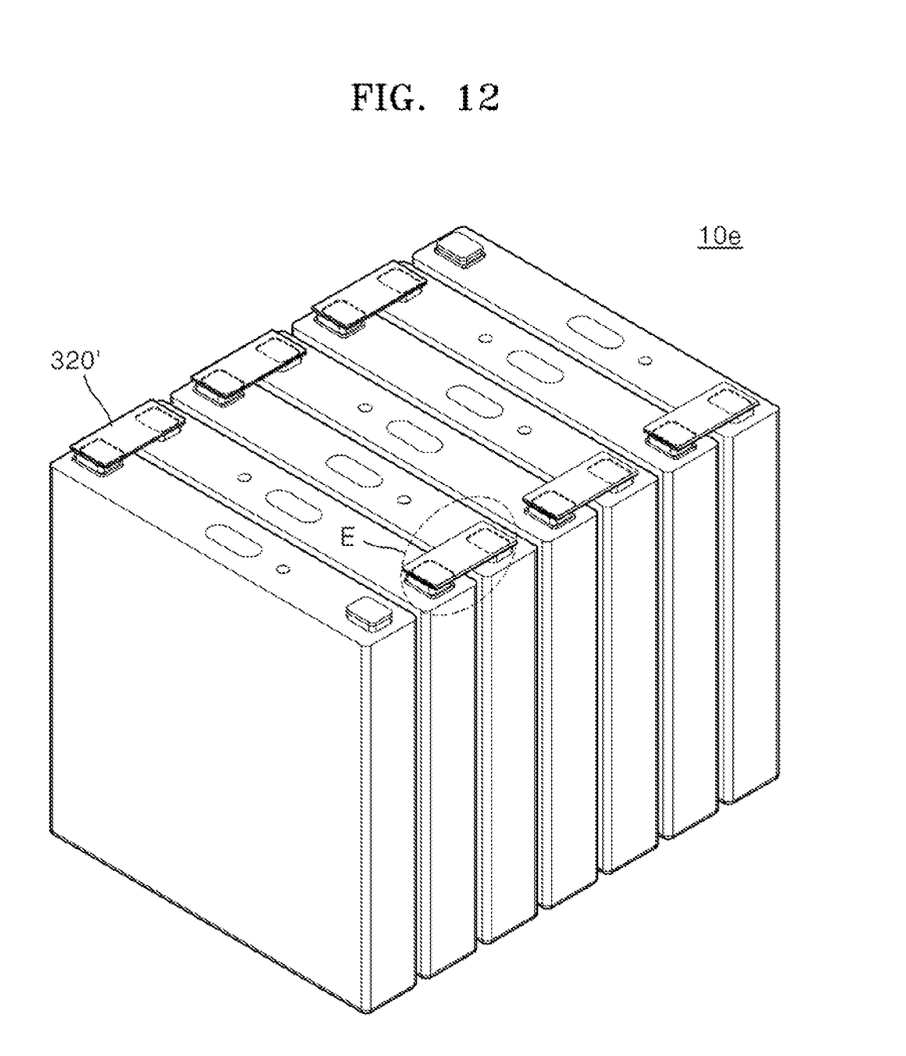
FIG. 12 illustrates a perspective view schematically depicting a secondary battery module according to another embodiment.
Figure 13:
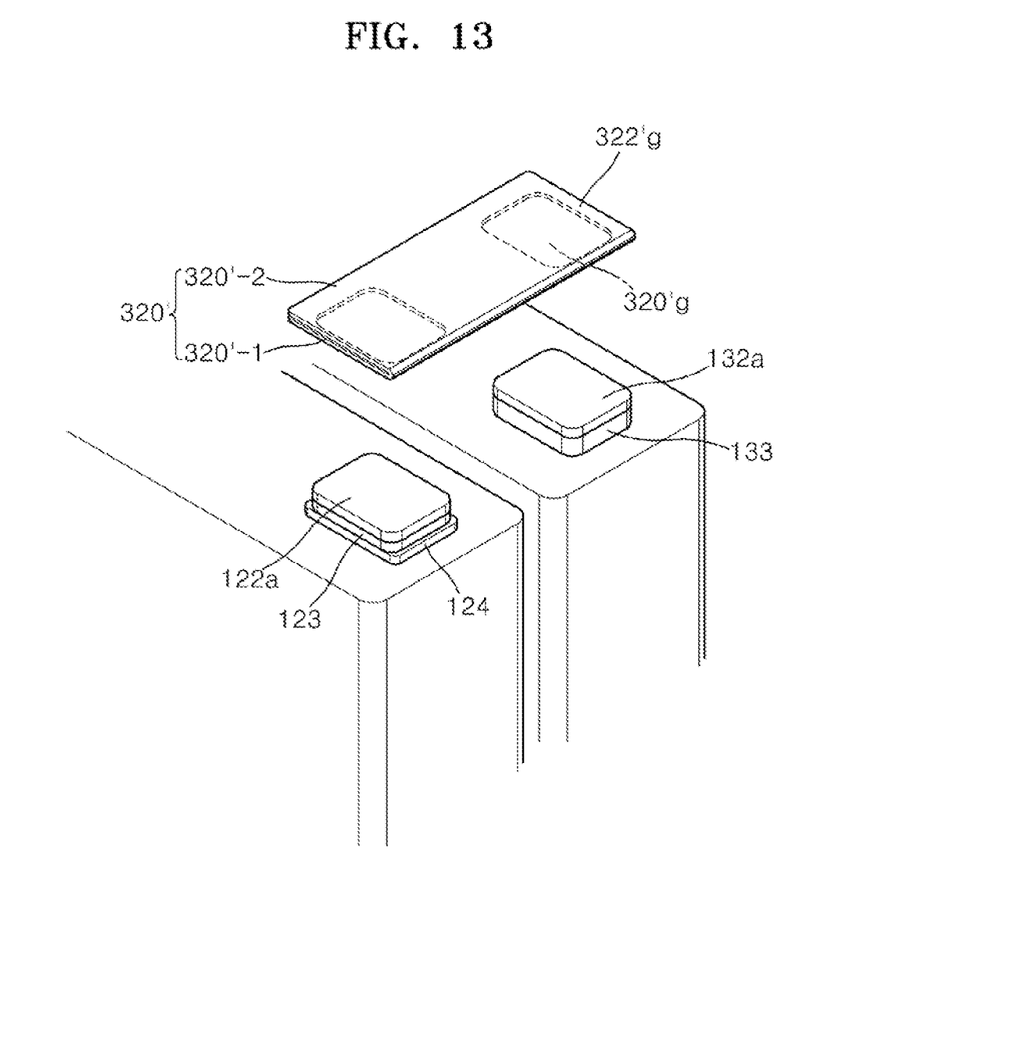
FIG. 13 illustrates an enlarged exploded perspective view depicting Portion E of FIG. 12.

FIG. 12 illustrates a perspective view schematically depicting a secondary battery module 10e according to another embodiment, and FIG. 13 illustrates an enlarged exploded perspective view depicting Portion E of FIG. 12. In FIGS. 12 and 13, the same elements as those of the secondary battery module 10d illustrated in FIG. 9 are denoted by the same reference numerals, and descriptions thereof are not repeated.

Referring to FIGS. 12 and 13, unlike in the embodiment shown in FIG. 10, bus bars 320' may include: first parts 320'-1 having a plurality of first and second recesses 320'g and 322'g formed in bottom and top sides thereof; and second parts 320'-2 bent to face the first parts 320'-1.

After attaching the bus bars 320' to first and second collecting terminals 122a and 132a, the second parts 320'-2 may be bent to face the first parts 320'-1.

According to the secondary battery module 10e of the current embodiment, owing to the second parts 320'-2 extending from the first parts 320'-1, the bus bars 320' may have a desired current capacity although the thickness of the bus bars 320's are decreased.

By way of summation and review, positive and negative electrode terminals of secondary batteries of a battery module may be electrically connected through bus bars for supplying electricity. According to the one or more of the above embodiments, the bus bars of the secondary battery module may have a thin thickness so that the bus bars may be welded using low power. In addition, the bus bars may have a thin thickness and large area.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A secondary battery module, comprising:
a plurality of secondary batteries each including an electrode assembly, a case accommodating the electrode assembly, and electrode terminals electrically connected to the electrode assembly and extending outward from the case; and
a bus bar that electrically connects neighboring electrode terminals of the plurality of secondary batteries,
wherein the bus bar includes:
a first part including penetration holes through which the electrode terminals penetrate such that the bus bar is fastenable to the electrode terminals; and
a second part extending from the first part, the second part being bent to face the first part and not overlapping the penetration holes.

2. A secondary battery module, comprising:
a plurality of secondary batteries each including an electrode assembly, a case accommodating the electrode assembly, and electrode terminals electrically connected to the electrode assembly and extending outward from an outer surface of the case; and
a bus bar that electrically connects neighboring electrode terminals of the plurality of secondary batteries,
wherein the bus bar includes:
a first part including penetration holes through which the electrode terminals penetrate such that the bus bar is fastenable to the electrode terminals; and
a second part extending from the first part, the second part being bent to face the first part, and
wherein a distance from the outer surface of the case to an outer side of the second part is greater than a distance from the outer surface of the case to an outer side of the first part, and
wherein the second part does not overlap the penetration holes.

3. A secondary battery module, comprising:
a plurality of secondary batteries each including an electrode assembly, a case accommodating the electrode assembly, and electrode terminals electrically connected to the electrode assembly and extending outward from an outer surface of the case; and
a bus bar that electrically connects neighboring electrode terminals of the plurality of secondary batteries,
wherein the bus bar includes:
a first part including penetration holes through which the electrode terminals penetrate such that the bus bar is fastenable to the electrode terminals; and
a second part extending from the first part, the second part being bent to face the first part,
wherein a distance from the outer surface of the case to an outer side of the second part is greater than a distance from the outer surface of the case to an outer side of the first part, and
wherein a distance from an inner side of the bus bar to an outer side of the bus bar at a region thereof that includes the second part is greater than a distance from the inner side of the bus bar to the outer side of the bus bar at a region thereof that includes the penetration holes.

4. The secondary battery module as claimed in claim 3, wherein the second part has a T-shape or H-shape.

5. The secondary battery module as claimed in claim 3, wherein the first part and the second part have a same thickness.

6. The secondary battery module as claimed in claim 3, wherein the bus bar is fastenable to the electrode terminals using nuts.

7. The secondary battery module as claimed in claim 3, wherein the secondary batteries are connected in series or parallel with each other through the bus bar.

* * * * *